US012446999B2

(12) United States Patent
Sato (10) Patent No.: US 12,446,999 B2
(45) Date of Patent: Oct. 21, 2025

(54) METHOD FOR PROVIDING DENTAL MOUTHPIECE HAVING SPACE FOR MEDICINE AND METHOD FOR USING SAME (71) Applicant: DSi CORPORATION, Tokyo (JP)

(72) Inventor: Hiroshi Sato, Tokyo (JP)

(73) Assignee: DSi Corporation, Tokyo (JP)

( * ) Notice: Subject to any disclaimer, the term of this patent is extended or adjusted under 35 U.S.C. 154(b) by 277 days.

(21) Appl. No.: 17/926,682

(22) PCT Filed: May 19, 2021

(86) PCT No.: PCT/JP2021/018976
§ 371 (c)(1),
(2) Date: Nov. 21, 2022

(87) PCT Pub. No.: WO2021/235484
PCT Pub. Date: Nov. 25, 2021

(65) Prior Publication Data
US 2023/0190434 A1 Jun. 22, 2023

(30) Foreign Application Priority Data
May 22, 2020 (JP) .................................. 2020-089894

(51) Int. Cl.
*A61C 19/06* (2006.01)
(52) U.S. Cl.
CPC .................................. *A61C 19/063* (2013.01)
(58) Field of Classification Search
CPC ..... A61C 19/063; A61C 19/06; A61C 19/066; A61C 19/00; A61C 9/0046;
(Continued)

(56) References Cited

U.S. PATENT DOCUMENTS 6,276,935 B1 * 8/2001 Funt .................... A61M 31/002
433/80
2003/0211440 A1 * 11/2003 Kuo ..................... A61C 19/063
433/215
(Continued)

FOREIGN PATENT DOCUMENTS

JP  2013-63243 A   4/2013
JP  2016-214817 A  12/2016
(Continued)

OTHER PUBLICATIONS

Extended European Search Report issued May 3, 2024 in Application No. 21809702.0.

*Primary Examiner* — Heidi M Eide
*Assistant Examiner* — Lina Faraj
(74) *Attorney, Agent, or Firm* — Faegre Drinker Biddle & Reath LLP (57) ABSTRACT A method of providing a dental mouthpiece comprises: an oral cavity shape acquisition step for acquiring the shape of the oral cavity; a design requirement specification step of receiving a selected range and an amount of a medicine as design requirements; and a design step for outputting design on the basis of the shape of the oral cavity and the range and amount of application of the medicine, design data of a dental mouthpiece that is provided with a space for the medicine and is able to retain the above-mentioned amount of the medicine in the application range.

4 Claims, 6 Drawing Sheets (58) Field of Classification Search
CPC ............ A61C 13/0004; A61M 16/049; A61M 2210/0625; A61M 2210/0631; A61M 2210/0637; A61M 2210/0643
See application file for complete search history.

(56) References Cited

U.S. PATENT DOCUMENTS

| | | | |
|---|---|---|---|
| 2003/0232311 A1* | 12/2003 | Keller | A61P 1/02 433/80 |
| 2006/0068353 A1* | 3/2006 | Abolfathi | A61C 7/00 433/2 |
| 2006/0115785 A1* | 6/2006 | Li | A61P 29/00 433/80 |
| 2009/0136893 A1* | 5/2009 | Zegarelli | A61C 19/066 433/80 |
| 2014/0011162 A1* | 1/2014 | Zegarelli | H02K 1/2733 433/215 |
| 2016/0278901 A1* | 9/2016 | Zegarelli | A61K 9/06 |
| 2017/0100214 A1* | 4/2017 | Wen | A61C 7/08 |
| 2018/0168788 A1* | 6/2018 | Fernie | A61C 19/063 |
| 2019/0105842 A1* | 4/2019 | Dau | B33Y 50/00 |
| 2019/0247173 A1* | 8/2019 | Zegarelli | A61C 19/066 |
| 2019/0247174 A1* | 8/2019 | Zegarelli | A61C 9/0046 |
| 2023/0049287 A1 | 2/2023 | Fisker | |

FOREIGN PATENT DOCUMENTS

| | | | | |
|---|---|---|---|---|
| JP | 2020-503919 A | 2/2020 | | |
| WO | WO-2018/118200 A1 | 6/2018 | | |
| WO | WO-2021148622 A1 * | 7/2021 | ............ | G06T 7/12 |

* cited by examiner

METHOD FOR PROVIDING DENTAL MOUTHPIECE HAVING SPACE FOR MEDICINE AND METHOD FOR USING SAME

CROSS REFERENCE TO PRIOR APPLICATIONS

This application is the National Stage of International Application No. PCT/JP2021/018976 filed May 19, 2021 and claims benefit of Japanese Application No. 2020-089894 filed May 22, 2020, which are herein incorporated by reference in their entirety.

TECHNICAL FIELD

The present invention relates to a method of providing a dental mouthpiece with a space for medicine and a method of using the same.

BACKGROUND ART

In recent years, dental mouthpieces have been used to prevent and treat periodontal disease and other oral infections, to prevent tooth decay, and for whitening. A medicine is applied to the inside of the dental mouthpiece, which is made to fit the patient's dentition. By wearing this medicine-applied dental mouthpiece in the mouth, the medicine can be kept in close contact with the dentition and gums for an extended period of time.

Some dental mouthpieces have special spaces on the inside to keep medicines in place. For example, Patent Literature 1 discloses a dental mouthpiece with a grooved space for medicines along the cervical gingival line (near the border between the dentition and gingiva).

According to Patent Literature 1, the manufacturing method of a dental mouthpiece is, for example, as follows. First, a plaster cast of a tooth shape is made by intraoral impression. Next, a member such as a kite string is bonded along the cervical gingival line of the plaster model. Then, a heated polyethylene sheet is placed over the plaster model, pressurized, and cooled. The polyethylene sheet is then removed from the plaster model, and unnecessary portions are trimmed to complete the dental mouthpiece.

PRIOR ART LITERATURE

Patent Literature

[Patent Literature 1]
Japanese Patent Laid-Open No. 2016-214817

SUMMARY OF THE INVENTION

Problems to be Solved by the Invention

However, in the method described in Patent Literature 1, the size of the space for the medicine cannot be precisely designed because the space for the medicine is formed by wrapping a member such as a kite string around a plaster model. Dentists formulate a treatment plan by observing the condition of the patient's affected area and other factors, and at a certain point carefully determine the type and amount of the medicine that the patient should use. However, conventional dental mouthpieces cannot make the appropriate amount of medicine stay in the appropriate area.

In addition, the intraoral shapes of patients, e.g., the size of interdental spaces, are diverse. If this is not taken into account and a uniform space for the medicine is formed as in the past, there is a risk of over- or under-delivery of the medicine for the patient.

Therefore, there is a need to develop a method for providing and using dental mouthpieces with appropriately sized spaces for medicines.

Means to Solve the Problems

In one embodiment, a method of providing a dental mouthpiece has the following steps: an intraoral shape acquisition step for acquiring an intraoral shape, a design requirement specification step for accepting a specification of an application range and amount of a medicament as a design requirement, and a design step for outputting, based on said intraoral shape, said application range, and said amount, design data of a dental mouthpiece equipped with a space for a medicine capable of retaining said amount of said medicine within said application range.

In one embodiment, the method of providing a dental mouthpiece comprises: an intraoral shape acquisition step for acquiring an intraoral shape; a design requirement specification step for specifying an application range and an amount of a medicine as design requirements; and a design step, using a computer, for outputting design data of a dental mouthpiece equipped with a space for the agent capable of retaining said amount of said agent within said application range based on said intraoral shape, said application range and said amount.

In one embodiment, the method of providing a dental mouthpiece has a manufacturing step of manufacturing the dental mouthpiece based on said design data output by the above method.

In one embodiment, the method of using the dental mouthpiece has a wearing step of applying said amount of said medicine to the space for said medicine in said dental mouthpiece manufactured by the above method and wearing it in the oral cavity for a predetermined period of time.

In one embodiment, the method of using the dental mouthpiece comprises a first dental mouthpiece and a second dental mouthpiece manufactured by the above method based on the first and second said design requirements, respectively. The method of using a dental mouthpiece has a first wearing step of applying a medicine in an amount according to the first design requirements to the space for said medicine in the first dental mouthpiece during a first period of time and placing said medication in the oral cavity, and a second wearing step of applying an amount of the medicine according to the second design requirement to the space for the medicine in the second dental mouthpiece during a second period of time and placing the medicine in the oral cavity.

Effects of the Invention

The present invention provides a dental mouthpiece with an appropriately sized space for medicine and a method of using the mouthpiece.

DETAILED DESCRIPTION OF THE EMBODIMENT

The following is a detailed description of specific embodiments in which the invention is applied, with reference to the drawings.

Figure 1A:
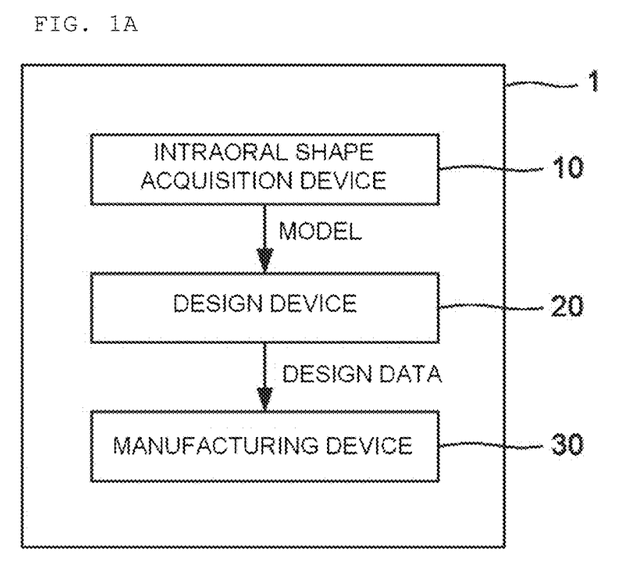
FIG. 1A is a block diagram showing the overall configuration of system 1.

FIG. 1A is a block diagram of the system 1 used in the method of providing dental mouthpieces.

System 1 includes an intraoral shape acquisition device 10, a design device 20, and a manufacturing device 30.

The intraoral shape acquisition device 10 is a device for measuring the intraoral shape of a patient and acquiring a three-dimensional model thereof. The intraoral shape can be obtained, for example, by a 3D scan of the mouth, a 3D scan of a dental model, or by constructing a 3D model from a 2D image. The three-dimensional shape of the oral cavity that can be obtained by these methods is referred to in this paper as a three-dimensional model or simply a model. This model is typically three-dimensional point cloud data. Alternatively, the model may be three-dimensional polygon data or CAD data.

For example, IOS (Intra Oral Scanner (IOS), can capture images of a patient's oral cavity using a reader called a wand and output the intraoral shape as digital data. The wand emits light to objects in the mouth (teeth, gums, etc.) and detects the reflected light with a sensor to acquire point cloud data (models) that show the three-dimensional shape of the mouth.

Alternatively, the model may be obtained by creating a dental model (a model of a tooth shape, typically a plaster model, etc.) by intraoral impression and scanning the dental model using a general-purpose 3-D scanner or similar device.

Alternatively, the model may be constructed based on 2D images of the oral cavity or dental model taken by an optical camera, or 2D images of the oral cavity obtained by CT scan or radiography. For example, a known method of constructing a three-dimensional model based on multiple two-dimensional images taken from different angles can be employed.

Thus, the intraoral shape acquisition device 10 includes, for example, devices such as an IOS, a general-purpose 3D scanner, and a camera. Alternatively, an information processing device such as a smartphone, PC (personal computer), etc., which is pre-equipped with a scanner, camera, etc., or attached with these devices later, may be employed as the intraoral shape acquisition device 10. The latter type of device may include, for example, a smartphone with an attachment having the same functions as the IOS.

The design device 20 is an information processing device for designing dental mouthpieces. The design device 20 inputs the model output by the intraoral shape acquisition device 10, accepts various operations by the user (a dentist), and outputs design data for dental mouthpieces according to a predetermined procedure. The process is performed. The design data is data that defines the shape of the dental mouthpiece and is typically 3D CAD data. The design data is read by the manufacturing device 30 described below and used to manufacture the dental mouthpiece. The design data is not limited to 3D CAD data, but can be data in any format that can describe a 3D shape.

Figure 1B:
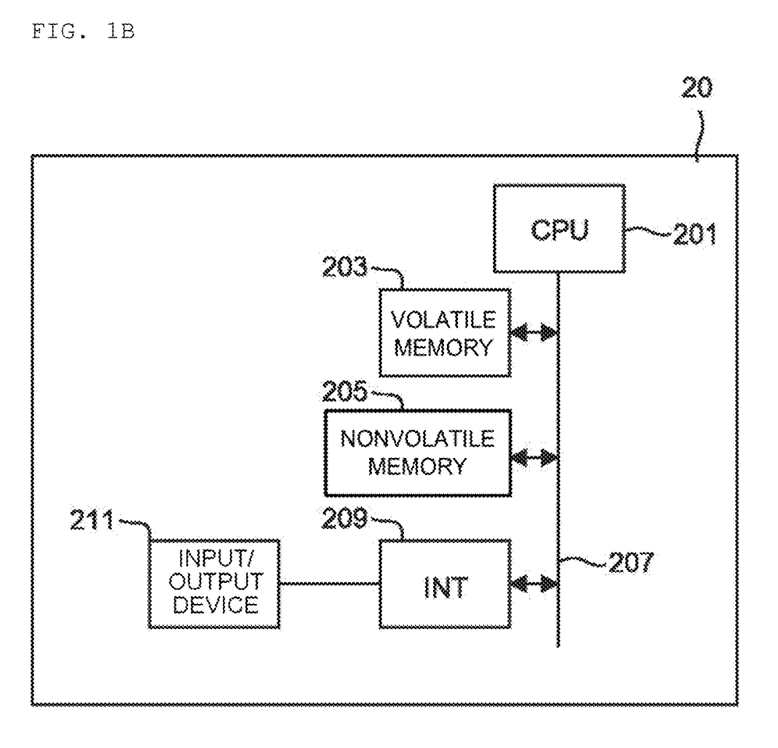
FIG. 1B is a block diagram showing the hardware configuration of the design device 20.

FIG. 1B is a block diagram showing the typical hardware configuration of the design device 20. The design device 20 includes a CPU (Central Processing Unit) 201, volatile memory 203, nonvolatile memory 205, bus 207, interface 209, and an input/output device 211.

The CPU 201 reads the program stored in nonvolatile memory 205 via bus 207 and executes information processing according to the program to realize the specific functions. In this embodiment, the CPU 201 is used to execute a 3D CAD application.

Nonvolatile memory 205 is a storage device that retains its memory state regardless of the power supply status of the design device 20, such as a hard disk or SSD, etc. Generally, programs and data stored in nonvolatile memory 205 are extracted to volatile memory 203 during program execution.

The volatile memory 203 is a storage device that stores programs and data extracted from the nonvolatile memory 205, as well as temporary calculation data and data input or output via the input/output device 211.

Input/output device 211 includes data output devices such as displays, data input devices such as keyboards and pointing devices, and communication interfaces that control communication with external parties. Display data output from the CPU 201 is displayed on the display through the interface 209. Commands and data input from the keyboard and pointing device are passed via the interface 209 to the CPU 201. The communication interface obtains the transmission data output by CPU 201 from interface 209 and outputs it to the external device. The communication interface also requires received data from the external device and passes it to the CPU 201 via interface 209. In this embodiment, the CPU 201 of the design device 20 is used to acquire the intraoral shape via the communication interface to acquire a model of the patient's intraoral shape from the intraoral shape acquisition device 10. The 3D CAD application then processes the model according to user operations accepted by the data input device to generate 3D CAD data of the dental mouthpiece. The CPU 201 transmits the 3D CAD data to the manufacturing device 30 via the communication interface.

The design device 20 is typically a stand-alone information processing device, such as a PC (Personal Computer), smartphone, tablet, etc. However, the invention is not limited to this and may be realized by any information processing resource, such as distributed processing servers, cloud computing, edge computing, fog computing, etc.

Figure 1C:
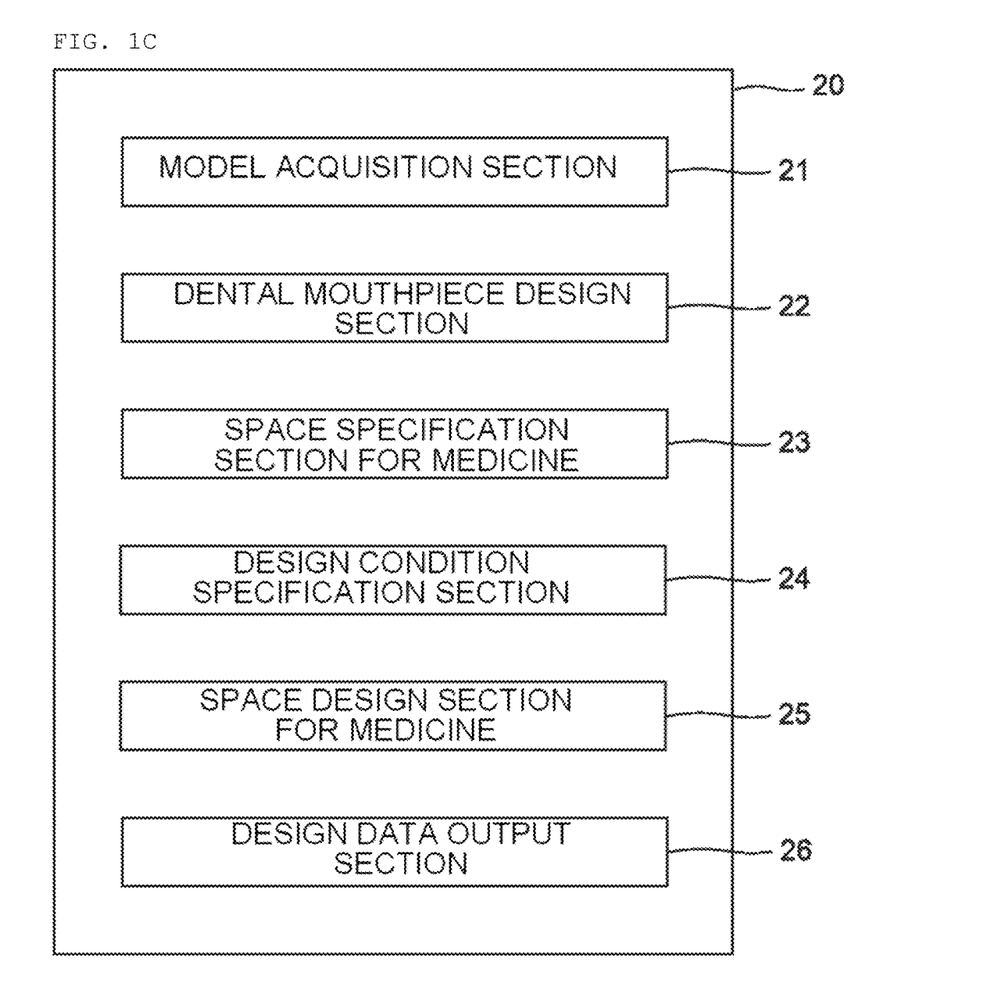
FIG. 1C is a block diagram showing the functional configuration of the design device 20.

FIG. 1C is a block diagram showing the functional configuration of the design device 20. The design device 20 has a model acquisition section 21, a dental mouthpiece design section 22, a space specification section for medicine 23, design condition specification section 24, space for space design section for medicine 25, and design data output section 26. The specific operations of each of these processing sections are described below.

The manufacturing device 30 is a device that molds and outputs dental mouthpieces based on the design data (typically 3D CAD data) output by the design device 20. For example, 3D printers, press molding machines, injection molding machines, and shaving molding machines are known as devices with such functions.

Figure 2:
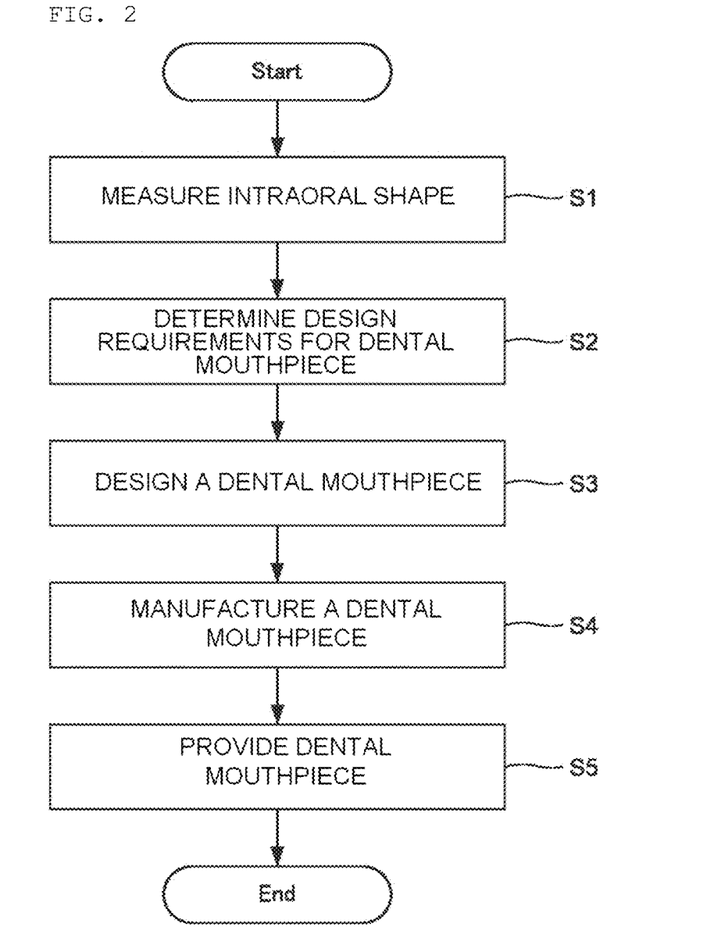
FIG. 2 is a flowchart showing a method of providing a dental mouthpiece with a space for medicine.

FIG. 2 is a flowchart showing the method of providing a dental mouthpiece.

Step 1 (S1): Measure Intraoral Shape

The intraoral shape acquisition device 10, operated by a dentist, measures the intraoral shape of the patient. The intraoral shape acquisition device 10 outputs a model of the patient's intraoral shape.

Step 2 (S2): Determine Design Requirements for Dental Mouthpiece

The dentist observes the condition of the affected area, etc., and formulates a treatment plan based on dentist's findings. In other words, the dentist determines the type of medicine to be administered to the patient, the dosage (volume of medicine), the site of administration (application), and the administration schedule.

The following is an example of a treatment plan formulated by a dentist.

Findings: Periodontal disease. Inflammation with bleeding.

Treatment strategy: First, apply antibiotics to the site of bleeding (phase 1).

The dose (volume) of medicine X to be applied is D1 ml. If the inflammation has subsided, apply the disinfectant to a larger area than in phase 1, including the area that was bleeding (phase 2). The dose (volume) of medicine Y to be applied is D2 ml.

In this example, multiple dental mouthpieces would be created as the treatment phase progresses; one for use in phase 1 and one for use in phase 2. The dental mouthpiece used in the first phase will have a space for the medicine with a capacity of at least D2 near the bleeding site. The mouthpiece used in the second phase has a more extensive space for the medicine with a capacity of at least D2. For example, a strip of space for the medicine is formed along the cervical gingival line at and around the bleeding site.

Step 3 (S3): Design a Dental Mouthpiece

The design device 20, operated by the dentist, inputs the model output in step 1 and outputs the design data for the dental mouthpiece. With reference to FIG. 1C, the operation of the design device 20 in step 3 is described.

The model acquisition unit 21 accepts input of the model (typically 3D point cloud data) generated by the design device 20 in step 1.

The dental mouthpiece design section 22 provides a design data for a dental mouthpiece without a space for medicine (typically 3D CAD data) based on the model obtained by the model acquisition unit 21. Methods for automatically or semi-automatically designing dental mouthpieces in general, i.e., without spaces for medicines, based on models are well known in the past. For this reason, a detailed explanation is omitted here.

Figure 3A:
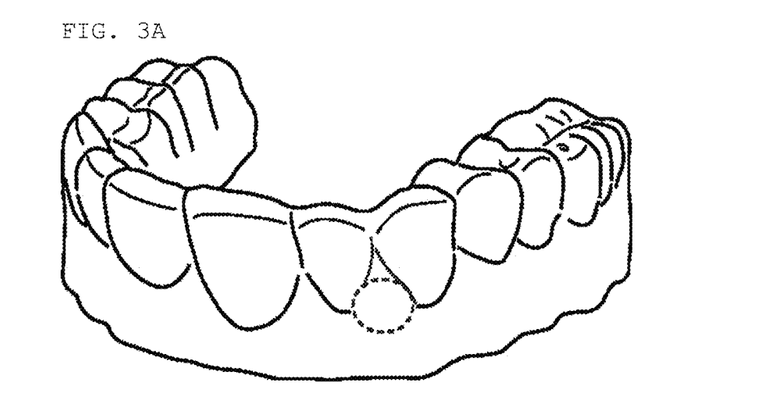
FIG. 3A is a drawing showing the process of designing a dental mouthpiece with space for medicine.
Figure 4A:
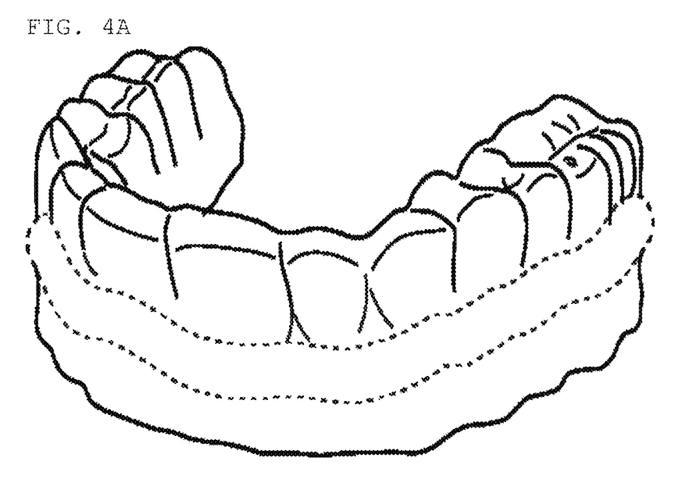
FIG. 4A is a drawing showing the process of designing a dental mouthpiece with a space for medicine.

The space specification section for medicine 23 accepts the user's (dentist's) instructions as to where on the dental mouthpiece the space for the medicine should be located and in what shape. In other words, it accepts instructions from the user regarding the range of application of the medicine. For example, the space specification section for medicine 23 displays on the screen the 3D CAD data of the dental mouthpiece created by the dental mouthpiece design unit 22 and accepts the area designation operation for the CAD data. The solid lines in FIG. 3A and FIG. 4A show the 3D CAD data of the dental mouthpiece displayed on the screen. Here, the dentist operates the pointing device to draw an arbitrary closed figure on the surface of the dental mouthpiece (hereinafter referred to as "region", shown as a dashed line in the figure). This designates the closed area indicated by the dashed line as the area that shows the location of the space for the medicine and its shape.

FIG. 3A shows an example of the user designating an area to provide space for the medicine in a narrow area that includes the bleeding area in order to create a dental mouthpiece for use in the first phase of the treatment strategy described above. FIG. 4A shows an example of a user designating an area to provide space for medicine in a wide area, including the bleeding area, in a band along the cervical gingival line for use in the second phase of the treatment strategy described above.

The method disclosed here is only an example, and other methods may be used to specify the position and shape of the space for the medicine. For example, instead of 3D CAD data of a dental mouthpiece, the space specification section for medicine 23 may display a 3D model of the intraoral shape on the screen and accept area specification for this model. Alternatively, the area designation may be accepted by having the user trace the surface of the dental model with a digitizer or a pen with a probe, and acquiring the trajectory of the pen tip. Instead of having the user draw a figure using a pointing device as described above, the position and shape of the area may be specified by having the user input information such as coordinates and size from a pointing device or keyboard. For example, if you want the user to specify a closed circular region of radius R centered at an arbitrary point P on the surface of the 3D CAD data of a dental mouthpiece or intraoral shape, the coordinates of point P and the value of radius R can be input from a pointing device or keyboard.

In the above example, the user (dentist) directly specifies the location and shape of the space for the medicine, but instead of or as an auxiliary for this, an interface may be provided that allows the user (dentist) to indicate the location and shape of the space for the medicine more broadly. In this case, the space specification section for medicine 23 calculates the specific position and shape of the space for medicine in response to the user's abstract instructions. For example, the space specification section for medicine 23 presents the user with choices such as "maxillary anterior teeth, maxillary left back teeth, maxillary right back teeth, mandibular anterior teeth, mandibular left back teeth, mandibular right back teeth" to roughly specify the area where the space for the medicine is formed. The space specification section for medicine 23 automatically determines the position and shape of the space for the medicine according to the result of the user's selection. To perform this process, the space specification section for medicine 23 shall have logic to determine the appropriate location and shape of the space for medicines based on the results of the user's selection. For example, when "front teeth" is selected, the area with a predetermined offset around the cervical gingival line is set for teeth #1 to #3, and when "back teeth" is selected, the area is set for teeth #4 to #8. The user can specify the space for the medicine in the "Space Designation" section. The user may accept the area proposed by the space specification section for medicine 23 as it is, or may modify the proposed area accordingly.

The design condition specification section 24 accepts input of the amount of medicine to be applied to the space inside the dental mouthpiece for the medicine. Here, the user can enter the dosage determined in step 2 as a numerical value. In the example of the treatment plan described above, the user enters the volume D1 of medicine X when creating the dental mouthpiece to be used in the first phase, and the volume D2 of medicine Y when creating the dental mouthpiece to be used in the second phase.

In the above example, the user (dentist) specifies the dosage of the medicine by a numerical value. As an alternative or a ways to assist with this, a function may be provided whereby the user selects a case, etc., and the design condition specification section 24 automatically calculates the dosage of the medicine according to the selected case, etc. For example, the design condition specification section 24 presents the user with one of the options such as "A, B, C . . . " indicating the level of progression of periodontal disease. When the user selects the progression level, the design condition specification section 24 determines or suggests (i.e., displays to the user) the appropriate dosage of the medicine according to the progression level. In this case, it is assumed that the design condition specification section 24 maintains in advance a rule (table, etc.) that maps cases, etc. to the appropriate dosage of the medicine. The user may accept the dosage suggested by the design condition specification section 24 as it is, or may modify the suggested dosage in light of circumstances such as the affected area being reddish or having a lot of tartar.

The space design section for medicine 25 calculates the volume V of the void bounded by the area designated by the space specification section for medicine 23, the patient's teeth and gingiva, and the space for medicine. In other words, it calculates the size of the space between the patient's teeth at the location where the space for medicine is to be provided. In general, the size of the interdental space varies from region to region, e.g., whether it is anterior or molar teeth, and also from patient to patient. Therefore, the system 1 can calculate the void V in the area specified by the dentist based on the patient-specific intraoral shape model and create a medicine space with an appropriate volume according to the void V.

Figure 3B:
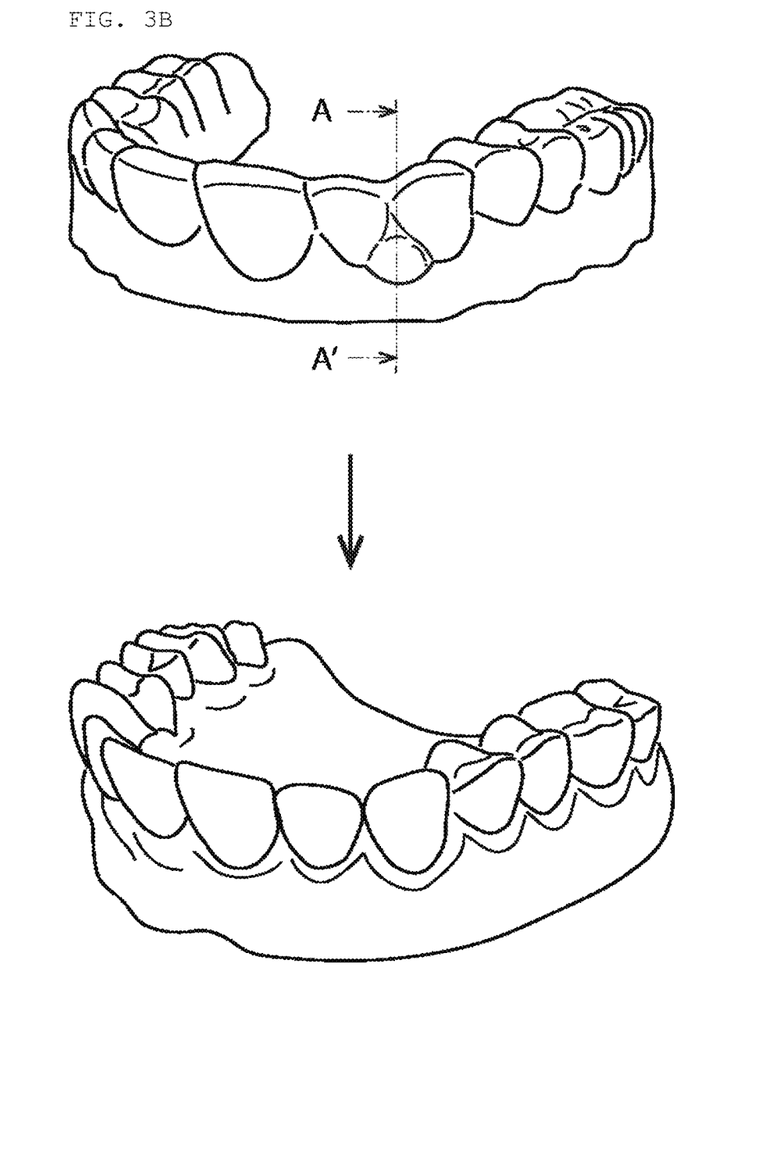
FIG. 3B is a drawing showing the process of designing a dental mouthpiece with a space for medicine.
Figure 3C:
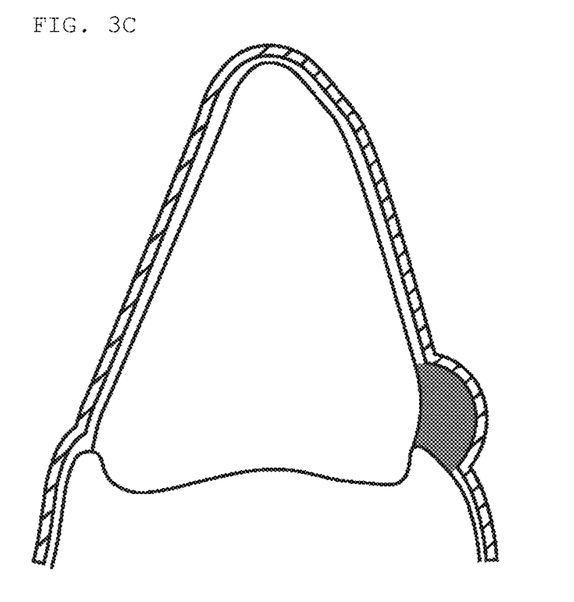
FIG. 3C is a drawing showing the process of designing a dental mouthpiece with a space for medicine.
Figure 4B:
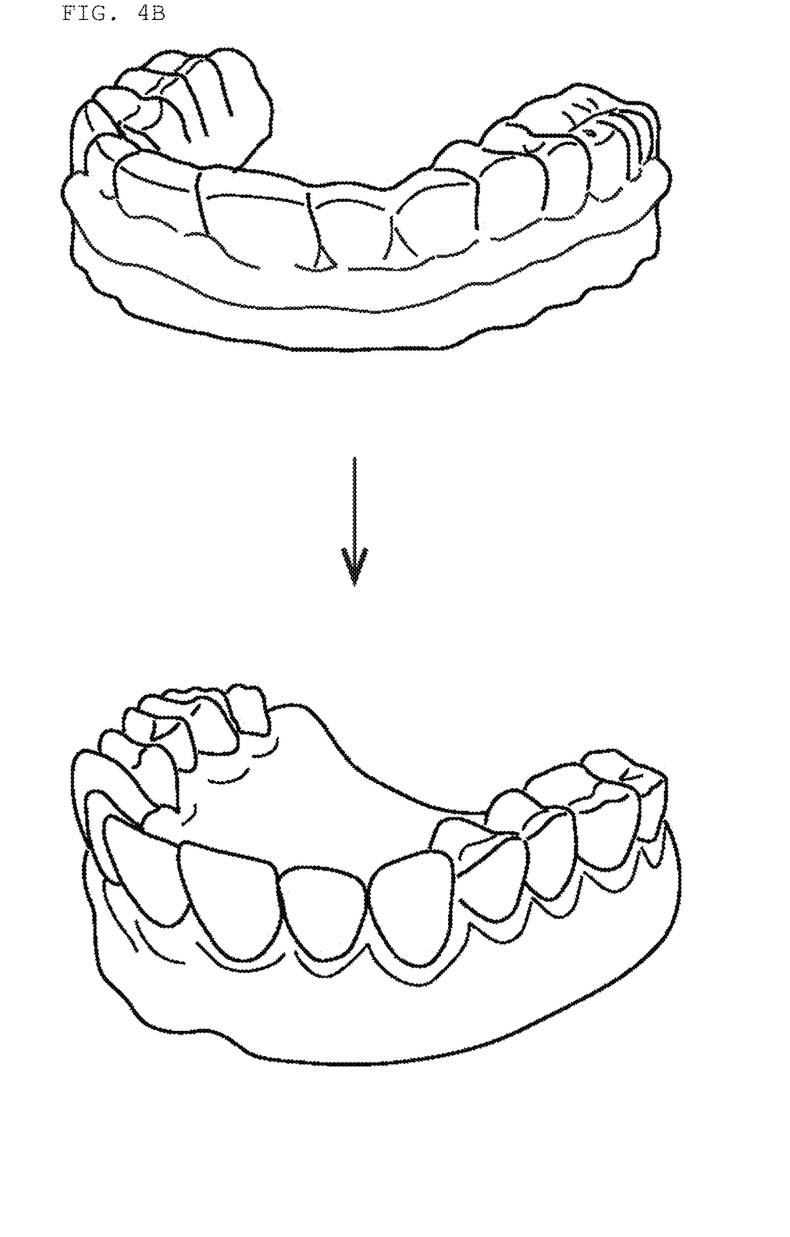
FIG. 4B is a drawing showing the process of designing a dental mouthpiece with a space for medicine.

The space design section for medicine 25 compares the volume V of the void with the volume D of the medicine to be applied, which is obtained by the design condition specification section 24. If D>V, the space design section for medicine 25 calculates the difference DIFF (=D−F). Then, a portion of the 3D CAD data of the dental mouthpiece is deformed to form at least a volume DIFF to form a medicine space with DIFF in the designated area. Typically, the shape of the dental mouthpiece is inflated labially, buccally, or lingually in the designated area to form the medicine space (FIG. 3B, FIG. 4B). In this case, the designated range may be fully expanded, or it may be formed so that it gradually rises from the outer edge of the designated range to the center. By doing the latter, discomfort when wearing the dental mouthpiece can be suppressed (FIG. 3C cross-section view according to A-A' of FIG. 3B).

If D<V, i.e., the volume of medicine D is smaller than the void V, there is a possibility that not enough medicine will be distributed to the area where the medicine is to be applied. In this case, the space design section for medicine 25 may issue a warning and recommend, for example, that the dosage of the medicine be reviewed.

The design data output section 26 outputs the design data (typically 3D CAD data) created by the space design section for medicine 25 to the manufacturing device 30.

Step 4 (S4): Manufacture a Dental Mouthpiece

The manufacturing device 30 obtains the design data output by the design data output section 26 in step 3. The manufacturing device 30 uses a biocompatible transparent resin or other material, such as resin, to mold and output dental mouthpieces according to design data. For example, dental mouthpieces can be manufactured by 3D printing, press molding, injection molding, machining molding, etc.

Step 5 (S5): Provide Dental Mouthpiece

A mouthpiece is provided to the patient. The patient is treated by wearing a dental mouthpiece with a space formed for medicine for a period of time and duration indicated by the dentist. The patient wears the mouthpiece while sleeping, for example, over a period of one week. Before each wearing, a medicine prescribed by the dentist (e.g., a paste containing herbal medicine) is applied to the space for the medicine in the dental mouthpiece. If the wearing period indicated by the dentist has expired, the patient follows the dentist's new instructions. For example, a newly designed dental mouthpiece may be provided to implement the next phase of treatment, or treatment may be terminated.

This embodiment can provide a dental mouthpiece with an optimally sized space for medicine according to the condition of the affected area and the shape of the patient's oral cavity. This ensures that the appropriate amount of medicine is brought into contact with the affected area and that the medicine is held in such a way that it does not flow out. In particular, when the amount and range of medicine application is to be varied according to the progress of treatment, providing multiple dental mouthpieces of different designs in stages makes it possible to administer the appropriate medicine in accordance with the treatment plan.

The present invention is not limited to the above-mentioned embodiments but can be modified as appropriate to the extent not to depart from the purpose of the invention. For example, in the above embodiment, the user (dentist) specifies the volume of the medicine, but other physical quantities or units may be specified instead of the volume of the medicine. In this case, the design condition specification section 24 calculates the volume of the medicine from the physical quantity, units, etc. entered. For example, if the specific gravity of the medicine is known, the weight of the medicine can be specified, and the design condition specification section 24 can convert it to the volume of the medicine. Or, if the weight of the active ingredient per unit volume is known, the weight of the active ingredient may be specified and converted to the volume of the medicine by the design condition specification section 24.

In the above example, it is mainly assumed that the dentist designs and manufactures the dental mouthpiece, but the present invention is not limited to this. For example, the dentist performs steps S1 through S3, and the manufacturing step in step S4 and thereafter can be performed by the patient at home or elsewhere. A 3D printer or the like may also be used to perform this step. Alternatively, the laboratory that receives the design data may perform the manufacturing in step S4 and deliver the completed dental mouthpiece to the patient. According to this method, for example, a patient undergoing treatment using multiple dental mouthpieces of different designs in stages can obtain a dental mouthpiece for a new phase without having to visit a dental clinic each time. Thus, the patient can continue treatment with less burden.

In the above-mentioned embodiment, it is assumed that the dentist performs steps S1 through S3. However, this is not limited to this, and any assistants or subcontractors may perform steps S1 through S3 based on the dentist's instructions.

The above-mentioned embodiments mainly disclosed a method of providing a dental mouthpiece intended for the treatment of periodontal disease and the like. However, the invention is not limited to this and can be applied to dental mouthpieces for any other use. For example, it can be applied to cosmetic and aesthetic applications such as periodontal disease prevention treatments and whitening. In this case, the steps that were performed by the dentist in the abovementioned forms can be performed by a dental hygienist or other practitioner.

DESCRIPTION OF REFERENCE NUMERALS 1 system
10 Intraoral shape acquisition device
20 Design device
30 Manufacturing device
201 CPU
203 Volatile memory
205 Nonvolatile memory
207 Bus
209 Interface
211 Input/output device
21 Model Acquisition Section
22 Dental Mouthpiece Design Section
23 Space specification section for medicine
24 Design condition specification section
25 Space design section for medicine
26 Design data output section

The invention claimed is:

1. A method for providing a dental mouthpiece, comprising:
   acquiring an intraoral shape;
   receiving a specification of a range and an amount of medicine application as a design requirement;
   calculating a volume of a space between teeth in the application range based on the intraoral shape;
   comparing the calculated volume of the space between teeth with a volume the medicine to be applied;
   if the volume of the medicine to be applied is greater than the calculated volume of the space between teeth, calculating a difference of the volume of the medicine and the calculated volume of the space between teeth;
   creating design data of a dental mouthpiece with the space for medicine capable of retaining the amount of medicine within the application range based on the calculated volume of the space, the application range, the amount, and the calculated difference; and
   manufacturing the dental mouthpiece based on the created design data.

2. A method for using a dental mouthpiece, comprising:
   applying the amount of the medicine to the space for the medicine in the dental mouthpiece produced by the method of claim 1,
   wherein the dental mouthpiece with the applied medicine is configured to be worn in an oral cavity for a predetermined period of time.

3. A method for using dental mouthpieces comprising:
   acquiring an intraoral shape;
   receiving a first specification of a first range and a first amount of medicine application as a first design requirement;
   calculating a first volume of a first space between teeth in the first application range based on the intraoral shape;
   comparing the calculated first volume of the space between teeth with a first volume the medicine to be applied;
   if the first volume of the medicine to be applied is greater than the calculated first volume of the space between teeth, calculating a first difference of the first volume of the medicine and the calculated first volume of the space between teeth;
   creating first design data of a first dental mouthpiece with the first space for medicine capable of retaining the first amount of medicine within the first application range based on the calculated first volume of the first space, the first application range, the first amount, and the calculated first difference; and
   manufacturing the first dental mouthpiece based on the created first design data,
   receiving a second specification of a second range and a second amount of medicine application as a second design requirement;
   calculating a second volume of a second space between teeth in the second application range based on the intraoral shape;
   comparing the calculated second volume of the space between teeth with a second volume the medicine to be applied;
   if the second volume of the medicine to be applied is greater than the calculated second volume of the space between teeth, calculating a second difference of the second volume of the medicine and the calculated second volume of the space between teeth;
   creating second design data of a second dental mouthpiece with the second space for medicine capable of retaining the second amount of medicine within the second application range based on the calculated second volume of the second space, the second application range, second amount, and the calculated second difference; and
   manufacturing the second dental mouthpiece based on the created second design data;
   applying the first amount of the medicine according to the first design requirements to the first space for said medicine of the first dental mouthpiece during a first period of time, wherein the first dental mouthpiece with the applied medicine is configured to be worn in an oral cavity; and
   applying said second amount of said medicine according to said second design requirement to said second space for said medicine in said second dental mouthpiece, wherein the second dental mouthpiece with the applied medicine is configured to be worn in the oral cavity during a second period of time, the second period of time different from the first period of time.

4. A method for using dental mouthpieces according to claim 3,
   wherein the first dental mouthpiece has the first space for the medicine in a narrow area that corresponds an affected bleeding area, and the second dental mouthpiece has the second space for the medicine in a strip along a cervical gingival line over a larger area than the narrow area, the larger area corresponds the affected bleeding area.

* * * * *